US009434656B2

(12) United States Patent
Ishihara et al.

(10) Patent No.: US 9,434,656 B2
(45) Date of Patent: Sep. 6, 2016

(54) WET BLANKET

(71) Applicant: Nichias Corporation, Tokyo (JP)

(72) Inventors: Tetsuya Ishihara, Tokyo (JP); Tetsuya Mihara, Tokyo (JP); Ken Yonaiyama, Tokyo (JP); Tomohiko Kishiki, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 373 days.

(21) Appl. No.: 14/080,107

(22) Filed: Nov. 14, 2013

(65) Prior Publication Data

US 2014/0069566 A1 Mar. 13, 2014

Related U.S. Application Data

(62) Division of application No. 13/064,638, filed on Apr. 5, 2011.

(30) Foreign Application Priority Data

Mar. 30, 2011 (JP) .................................. 2011-075913

(51) Int. Cl.

| | |
|---|---|
| B29C 67/00 | (2006.01) |
| C04B 41/00 | (2006.01) |
| D01F 9/08 | (2006.01) |
| D06M 11/79 | (2006.01) |
| F27D 1/00 | (2006.01) |
| C04B 35/14 | (2006.01) |
| C04B 35/622 | (2006.01) |
| C04B 35/626 | (2006.01) |
| C04B 35/63 | (2006.01) |
| C04B 35/80 | (2006.01) |
| C03C 13/00 | (2006.01) |
| C04B 41/50 | (2006.01) |
| C03C 25/10 | (2006.01) |

(52) U.S. Cl.

CPC ............. *C04B 41/009* (2013.01); *C03C 13/00* (2013.01); *C03C 25/101* (2013.01); *C04B 35/14* (2013.01); *C04B 35/6224* (2013.01); *C04B 35/6263* (2013.01); *C04B 35/6316* (2013.01); *C04B 35/803* (2013.01); *C04B 41/5089* (2013.01); *D01F 9/08* (2013.01); *D06M 11/79* (2013.01); *F27D 1/0013* (2013.01); *C03C 2213/02* (2013.01); *C04B 2235/3418* (2013.01); *C04B 2235/5232* (2013.01); *C04B 2235/616* (2013.01); *Y10T 156/10* (2015.01); *Y10T 442/2631* (2015.04)

(58) Field of Classification Search
CPC .............................. C04B 41/009; C04B 41/45
See application file for complete search history.

(56) References Cited

U.S. PATENT DOCUMENTS

| | | | |
|---|---|---|---|
| 4,040,847 | A | 8/1977 | Miiller |
| 4,104,426 | A | 8/1978 | Gonzalez et al. |
| 4,552,804 | A | 11/1985 | Payne |
| 4,746,597 | A | 5/1988 | Zellmer et al. |
| 5,308,692 | A | 5/1994 | Kennedy et al. |
| 5,332,699 | A | 7/1994 | Olds et al. |
| 5,346,868 | A | 9/1994 | Eschner |
| 6,372,089 | B1 | 4/2002 | Keiser et al. |
| 6,987,076 | B1 | 1/2006 | Jubb et al. |
| 7,413,797 | B2 | 8/2008 | de Souza |
| 7,615,505 | B2 | 11/2009 | Asano et al. |
| 2009/0060802 | A1 | 3/2009 | Beauharnois |
| 2009/0304560 | A1 | 12/2009 | Dietz |

FOREIGN PATENT DOCUMENTS

| | | |
|---|---|---|
| CN | 1316981 A | 10/2001 |
| CN | 1318040 A | 10/2001 |
| CN | 1544373 A | 11/2004 |
| CN | 1830903 A | 9/2006 |
| CN | 101454148 A | 6/2009 |
| GB | 2 383 793 A | 9/2003 |
| JP | 52-135354 | 11/1977 |
| JP | 61-125137 | 8/1986 |
| JP | 2000-220037 | 8/2000 |
| JP | 3227586 | 9/2001 |
| JP | 2002-524384 | 8/2002 |
| JP | 2005-514318 | 5/2005 |
| JP | 2006-89881 | 4/2006 |
| JP | 2006-282404 | 10/2006 |
| JP | 2006-306713 | 11/2006 |
| JP | 2007-63078 | 3/2007 |
| JP | 2007-197264 | 8/2007 |
| JP | 2008-013402 | 1/2008 |
| JP | 4319355 | 8/2009 |
| JP | 4545623 | 9/2010 |
| WO | WO 87/05007 | 8/1987 |
| WO | 94/15883 A1 † | 7/1994 |
| WO | WO 94/15883 | 7/1994 |
| WO | 00/15574 A1 † | 3/2000 |
| WO | WO 00/15573 | 3/2000 |
| WO | 2007/143067 A2 † | 12/2007 |

OTHER PUBLICATIONS

Unifrax Product Information Sheet, "Fiberfrax® Blanket and Mat Products," Dec. 1, 2010.
Zhou Ningsheng, et al, Recent developments of monolithic refractories, vol. 38, No. 3, pp. 196-203, 2004.
Brochure, Superclad 612 published prior to end 2006.†
Brochure, ZRCI Refractory composites bearing a Jul. 2005 date www.zrci.com/zrci030.pdf.†
Brochure, Superclad 607 Max published prior to end 2006.†

† cited by third party

*Primary Examiner* — Stella Yi
(74) *Attorney, Agent, or Firm* — Steptoe & Johnson LLP

(57) ABSTRACT

A wet blanket obtained by impregnating a blanket including bio-soluble inorganic fibers with a colloidal silica liquid. A cured blanket obtained by curing the wet blanket.

20 Claims, No Drawings

WET BLANKET

TECHNICAL FIELD

The invention relates to a wet blanket comprising bio-soluble inorganic fibers.

BACKGROUND ART

Generally, in a heat treatment apparatus, an industrial furnace, a firing furnace or the like, a refractory material is provided on the inner wall surface of a heating room. As such a refractory material, a blanket formed of inorganic fibers or the like is known, for example. A flexible refractory material such as a blanket can be easily applied to a curved surface corresponding to the shape of the place of application even when the place of application has a complicated shape.

When the above-mentioned fire refractory material is used as a lining material of a furnace, in particular, it is required to have resistance to wind erosion. Further, the refractory material is required to exhibit desired strength and fire resistance after being applied.

As the blanket used as the base material of a flexible refractory material, one formed of asbestos or ceramic fibers which has a small fiber diameter has heretofore been used. However, in recent years, a problem has been pointed out that inorganic fibers are inhaled by a human body and the inhaled fibers invade the lung. Under such circumstances, bio-soluble inorganic fibers which do not or hardly cause disorders even if inhaled by a human body have been developed (Patent Document 1, for example).

Further, although the invention disclosed in Patent Document 2 relates to mastics, not to a blanket, the document discloses mastics comprising bio-soluble alkaline earth metal silicate fibers and anionic colloidal silica having a pH of 4 to 7. The document states that solidification of the mastics can be prevented by containing anionic colloidal silica having a pH of 4 to 7 as a binder and by further containing a chelating agent, such as EDTA (ethylenediaminetetraacetic acid).

RELATED ART DOCUMENTS

Patent Documents

Patent Document 1: Japanese Patent No. 3227586
Patent Document 2: Japanese Patent No. 4319355

DISCLOSURE OF THE INVENTION

Subject to be Solved by the Invention

The invention is aimed at providing a flexible refractory material which can exhibit high strength after application and is safe to a human body.

Means for Solving the Problem

The inventors of the invention made intensive studies to solve the above-mentioned subject, and have found that the above-mentioned subject can be solved by a flexible refractory material which is a wet blanket comprising bio-soluble inorganic fibers and a colloidal silica liquid impregnated therein. The invention has been made based on this finding.

That is, the invention provides the following wet blanket or the like.

1. A wet blanket obtained by impregnating a blanket comprising bio-soluble inorganic fibers with a colloidal silica liquid.
2. The wet blanket according to 1 wherein the colloidal silica is acidic cationic colloidal silica.
3. The wet blanket according to 1 wherein the colloidal silica is acidic anionic colloidal silica.
4. The wet blanket according to one of 1 to 3 wherein the colloidal silica liquid has a pH of about 2 to about 6.
5. The wet blanket according to 1 wherein the colloidal silica is alkaline anionic colloidal silica.
6. The wet blanket according to 5 wherein the colloidal silica liquid has a pH of about 8 to about 11.
7. The wet blanket according to one of 1 to 6 wherein the bio-soluble inorganic fibers have the following composition:
Total of $SiO_2$, $ZrO_2$, $Al_2O_3$ and $TiO_2$: about 50 wt % to about 82 wt %
Total of alkali metal oxides and alkaline earth metal oxides: about 18 wt % to about 50 wt %.
8. The wet blanket according to one of 1 to 6 wherein the bio-soluble inorganic fibers have the following composition:
$SiO_2$: about 50 wt % to about 82 wt %
Total of CaO and MgO: about 10 wt % to about 43 wt %.
9. The wet blanket according to one of 1 to 6 wherein the bio-soluble inorganic fibers comprise about 66 wt % to about 82 wt % of $SiO_2$, about 10 wt % to about 33 wt % of CaO, about 1 wt % or less of MgO and about less than 3 wt % of $Al_2O_3$.
10. The wet blanket according to one of 1 to 6 wherein the bio-soluble inorganic fibers comprise about 66 wt % to about 82 wt % of $SiO_2$, about 1 wt % to about 9 wt % of CaO, about 10 wt % to about 30 wt % of MgO and about less than 3 wt % of $Al_2O_3$.
11. The wet blanket according to one of 1 to 10 which comprises the colloidal silica in an amount of about 10 parts by weight to about 200 parts by weight in terms of solid matter relative to 100 parts by weight of the bio-soluble inorganic fibers.
12. The wet blanket according to one of 1 to 11 wherein the solvent content is about 15 wt % to about 75 wt %.
13. A cured blanket obtained by curing the wet blanket according to one of 1 to 12.

Advantageous Effects of the Invention

According to the invention, a safe flexible refractory material which can exhibit a high strength after application can be provided.

Mode for Carrying out the Invention

The invention relates to a wet blanket which comprises bio-soluble inorganic fibers and is impregnated with a colloidal silica liquid (flexible refractory material). Since it contains bio-soluble fibers, even if inhaled by a human body, there is little danger of impairing the health. By impregnating the blanket with a colloidal silica liquid, the wind erosion resistance, flexural strength or the like of the applied blanket after it is cured by drying, heating or the like can be improved. Since a solvent is contained in the blanket, the solvent moves to the surface when drying, and at the same time, the silica also moves to the surface to allow the surface layer part to be colloidal silica rich, whereby the surface strength is improved. In the wet state, the blanket can keep the flexibility.

As the bio-soluble inorganic fibers constituting the blanket, fibers containing a Ca element can be given.

According to the studies made by the inventors, it has been revealed that, if the bio-soluble inorganic fibers contain a Ca element, in particular, Ca ions are eluted during the storage to exert effects on the stability of colloidal silica, and the refractory material is deteriorated easily. However, by impregnating the blanket with colloidal silica, even if the bio-soluble inorganic fibers constituting the blanket contain a Ca element, deterioration of the blanket can be suppressed even if the blanket is stored for a long period of time.

The bio-soluble inorganic fibers may be inorganic fibers with the following composition:
Total of $SiO_2$, $ZrO_2$, $Al_2O_3$ and $TiO_2$: 50 wt % to 82 wt %
Total of alkali metal oxides and alkaline earth metal oxides: 18 wt % to 50 wt %

The bio-soluble inorganic fibers may be inorganic fibers with the following composition:
$SiO_2$: 50 to 82 wt %
Total of CaO and MgO: 10 to 43 wt %

The bio-soluble inorganic fibers can be roughly divided into Mg silicate fibers containing a large amount of MgO and Ca silicate fibers containing a large amount of CaO. As the Mg silicate fibers, the following compositions can be exemplified.
$SiO_2$: 66 to 82 wt %
CaO: 1 to 9 wt %
MgO: 10 to 30 wt %
$Al_2O_3$: 3 wt % or less
Other oxides: Less than 2 wt %

As the Ca silicate fibers, the following compositions can be exemplified.
$SiO_2$: 66 to 82 wt % (68 to 80 wt %, 70 to 80 wt %, 71 to 80 wt % or 71 to 76 wt %, for example)
CaO: 10 to 34 wt % (20 to 30 wt % or 21 to 26 wt %, for example)
MgO: 3 wt % or less (1 wt % or less, for example)
$Al_2O_3$: 5 wt % or less (3.5 wt % or less or 3 wt % or less; or 1 wt % or more or 2 wt % or more, for example)
Other oxides: Less than 2 wt %

The above-mentioned inorganic fibers may or may not contain, as other oxides, one or more of alkali metal oxides ($K_2O$, $Na_2O$, or the like), $Fe_2O_3$, $ZrO_2$, $TiO_2$, $P_2O_4$, $R_2O_3$, $R_2O_3$ (R is selected from Sc, La, Ce, Pr, Nd, Sm, Eu, Gd, Tb, Dy, Ho, Er, Tb, Yb, Lu, Y or a mixture thereof). Other oxides may be contained in an amount of 0.2 wt % or less or 0.1 wt % or less.

The total of $SiO_2$, CaO, MgO and $Al_2O_3$ may exceed 98 wt % or may exceed 99 wt %.

The bio-soluble fibers may contain other components in addition to $SiO_2$ and an alkaline earth metal oxide (at least one of MgO and CaO, for example). For example, the bio-soluble fibers may contain one or two or more selected from the group consisting of alumina ($Al_2O_3$), titania ($TiO_2$), zirconia ($ZrO_2$), iron oxide ($Fe_2O_3$), manganese oxide (MnO) and potassium oxide ($K_2O$).

Bio-soluble inorganic fibers are inorganic fibers having a physiological saline dissolution ratio at 40° C. of 1% or more, for example.

The physiological saline dissolution ratio can be measured by the following method, for example. Specifically, at first, 1 g of a sample obtained by pulverizing inorganic fibers to 200 meshes or less and 150 mL of a physiological saline solution are charged in a conical flask (volume: 300 mL) and the flask is installed in an incubator at 40° C. Next, the conical flask is continuously subjected to horizontal vibration of 120 rotations per minute for 50 hours. Subsequently, the concentrations of elements (mg/L) contained in a filtrate obtained by filtration are each measured by means of an ICP emission spectroscopic analyzer. Then, the physiologically saline dissolution ratio (%) is calculated based on the measured concentrations of the elements and the contents (mass %) of the elements in inorganic fibers before dissolution.

Specifically, if the elements subjected to the measurement are silicon (Si), magnesium (Mg), calcium (Ca) and aluminum (Al), the physiologically saline dissolution ratio C (%) is calculated according to the following formula: C(%)= [Amount of filtrate (L)×(a1+a2+a3+a4)×100]/[Mass of inorganic fibers before dissolution (mg)×(b1+b2+b3+b4)/100]. In this formula, a1, a2, a3 and a4 are the measured concentrations (mg/L) of silicon, magnesium, calcium and aluminum, respectively, and b1, b2, b3 and b4 are the contents (mass %) of silicon, magnesium, calcium and aluminum contained in inorganic fibers before dissolution, respectively.

The inorganic fibers constituting the blanket preferably have an average fiber diameter of 10 μm or less, more preferably 6 μm or less.

The average fiber diameter means an average value obtained by the following method. The widths of 400 or more fibers which have arbitrarily been selected from a photograph (magnification: ×2,000 to 5,000) taken by means of a scanning type electron microscope (JSM-5800LV manufactured by JEOL Ltd.) are measured, and the average value of these calculated widths is taken as the average fiber diameter.

As the colloidal silica to be used in the invention, colloidal silica containing $SiO_2$ in an amount of 17.5 to 19.0 wt % and $Al_2O_3$ in an amount of 1.5 to 2.7 wt %, in terms of solid matter, can be given.

As the colloidal silica, acidic cationic colloidal silica can be used. The blanket has improved heat resistance by the use of acidic cationic colloidal silica.

Cationic colloidal silica means colloidal silica having positive charges on its surface. As the cationic colloidal silica, colloidal silica obtained by allowing the surface of a silica particle to be cationically charged by incorporating a compound of a polyvalent metal ion such as aluminum ion or an organic cationic compound on the surface or in the inside of an anionic colloidal silica can be given, for example.

The acidic cationic colloidal silica liquid preferably has a pH of 2 to 6, more preferably 2 to 5, and further preferably 4 to 5.

As the colloidal silica, alkaline anionic colloidal silica or acidic anionic colloidal silica can be used. In particular, heat resistance of the blanket is improved if a blanket composed of Ca silicate fibers is impregnated with alkaline anionic colloidal silica.

The anionic colloidal silica means colloidal silica having negative charges on the surface thereof.

The alkaline anionic colloidal silica liquid has a pH of preferably 8 to 11, more preferably 9 to 11. The acidic anionic colloidal silica liquid has a pH of preferably 2 to 6, more preferably 2 to 5.

The blanket impregnated with the acidic cationic colloidal silica or the alkaline anionic colloidal silica has improved storage stability as compared with the blanket impregnated with the acidic anionic colloidal silica. The reason therefor is that gelation caused by inorganic ions eluted from inorganic fibers hardly occurs.

The colloidal silica liquid which is used for the impregnation of the blanket has a solid content of appropriately 1 to 40 wt %, more appropriately 1 to 30 wt %, and further appropriately 1 to 25 wt %. Water is normally used as the solvent.

The wet blanket normally comprises the colloidal silica in an amount of 10 to 200 parts by weight relative to 100 parts by weight of inorganic fibers in terms of solid matter.

The amount of the acidic cationic colloidal silica is more preferably 10 to 180 parts by weight, further preferably 30 to 150 parts by weight. The amount of the anionic colloidal silica is preferably 10 to 180 parts by weight, further preferably 10 to 160 parts by weight, and particularly preferably 30 to 160 parts by weight.

When the amount of colloidal silica is too large, handling properties may be deteriorated. When the amount of colloidal silica is too small, uniform impregnation cannot be attained, resulting in non-uniform strength of the blanket.

The wet blanket of the invention has improved storage stability even if it does not contain a stabilizer such as a chelating agent. if coloring properties or the like are taken into consideration, it is preferred that no stabilizer be contained.

In the case where coloring properties are not taken into consideration, it may contain a stabilizer in an amount of about 0.1 to 1 wt % in terms of solid matter.

As the stabilizer which can be contained in the wet blanket, a chelating agent with a composition of EDTA (ethylenediaminetetraacetic acid).H.3 ($NH_4$), a chelating agent with a composition of EDTA.H.2 ($NH_4$), citric acid, maleic acid, tartaric acid, salicylic acid or the like can be given.

The wet blanket of the invention may not contain a viscosity controller or an organic binder which is used in mastics.

The solvent content of the wet blanket is appropriately 15 to 75 wt %, more appropriately 15 to 70 wt % and further preferably 30 to 70 wt %.

If the solvent content is in the above-mentioned range, desired flexibility can be exhibited.

The blanket which serves as the base material before wetting can be fabricated by continuously stacking a cotton-like material which is an assembly of inorganic fibers, followed by a needle-punch treatment.

The width or length of the blanket can be appropriately selected. The width is normally about 4 to 60 mm. It is preferred that the blanket have a bulk density of 0.08 to 0.20 $g/cm^3$, more preferably 0.10 to 0.20 $g/cm^3$, and further preferably 0.10 to 0.18 $g/cm^3$.

The wet blanket can be fabricated by impregnating the blanket with colloidal silica.

Impregnation of the blanket with the colloidal silica can be conducted by spraying colloidal silica liquid to the blanket or dipping the blanket in a colloidal silica liquid. The solvent content or the thickness of the blanket may be adjusted by subjecting the blanket to a dehydration treatment or press molding, if necessary.

In order to keep the wet state, the wet blanket is normally stored in a plastic bag, or the like. If the wet blanket is used immediately after the production, the blanket may be applied as it is without being kept in a plastic bag or the like.

The applied wet blanket is cured by drying, heating or the like.

The bulk density of the wet blanket which has been dried at 105° C. for 24 hours is preferably 0.18 to 0.50 $g/cm^3$, more preferably 0.20 to 0.46 $g/cm^3$, and further preferably 0.20 to 0.43 $g/cm^3$.

Further, the linear shrinkage by heating after drying at 105° C. for 24 hours of the wet blanket after the lapse of one week after the production and after the lapse of one month after the production is preferably 0 to 3.5%, more preferably 0.1 to 3.5%, and further preferably 0.1 to 3.0%.

EXAMPLES

The invention will be described in more detail according to Examples and Comparative Examples, which should not be construed as limiting the scope of the invention.

Example 1

Acidic Cationic Colloidal Silica

ST-AK (manufactured by Nissan Chemical Industries, Ltd., solid content: 20 wt %, average particle size: 20 nm, pH: 4.2, solvent: water) as the acidic cationic colloidal silica was sprayed onto 100 parts by weight of a blanket composed of bio-soluble inorganic fibers a ($SiO_2$ content: 74 wt %, CaO content: 25 wt %, MgO content: 0.3 wt %, $Al_2O_3$ content: 2 wt %) so that the blanket contained the acidic cationic colloidal silica in an amount of 50 parts by weight in terms of solid matter. Thereafter, water was removed by sucking, whereby a wet blanket with a water content of 57 wt % was prepared. The water (solvent) content was obtained according to the following formula:

Solvent content (%)=weight of colloidal silica liquid excluding the solid content/(weight of blanket+weight of colloidal silica liquid)×100

The wet blanket thus obtained was sealed in a polyethylene-made bag, and stored at 23° C. for 1 month and 2 months. Evaluation was made immediately after the production, one month after the production and two months after the production. The evaluation was conducted as follows. The results are shown in Table 1.

(1) Density

Density was measured after drying the wet blanket immediately after the production at 105° C. for 24 hours.

(2) Linear Shrinkage after Heating

After storing for a predetermined period of time, the wet blanket was dried at 105° C. for 24 hours. The shrinkage in the linear direction after heating at 1100° C. for 8 hours was measured.

(3) Flexural Strength

After storing for a predetermined period of time, the wet blanket was dried at 105° C. for 24 hours. A load was applied at a head speed of 10 mm/min by means of a universal tester to measure the breaking load, and the flexural strength was calculated according to the following formula:

Flexural strength (MPa)=(3×breaking load (N)×lower end-to-end distance (mm))/{2×width of the blanket (mm))×(thickness of the blanket (mm))$^2$}

(4) Wind Erosion Resistance

After storing for a predetermined period of time, the wet blanket was dried at 105° C. for 24 hours. Air was applied to the dried blanket for 1 hour at a velocity of 40 m/s in a direction which is vertical to the blanket. The case where no change was observed on the surface was evaluated as ◯, and the case where the surface was significantly scratched or curled was evaluated as X.

(5) Winding Properties

The wet blanket (having a thickness of 12 mm and a width of 10 cm) was wound around a SUS-made cylinder with a diameter of 120 mm, and the external appearance was visually observed. The case where problems such as breakage of the wet blanket did not occur was evaluated as ○, and the case where such problems occurred was evaluated as X.

Examples 2 to 7

Acidic Cationic Colloidal Silica

Wet blankets were prepared and evaluated in the same manner as in Example 1, except that the amount of spraying (the amount of impregnation) was changed from 50 parts by weight to 80 to 180 parts by weight in terms of solid content. The results are shown in Table 1.

Example 8

Acidic cationic colloidal silica

A wet blanket was prepared and evaluated in the same manner as in Example 3, except that a blanket composed of bio-soluble inorganic fibers b ($SiO_2$ content: 76 wt %, CaO content: 4 wt %, MgO content: 18 wt %, $Al_2O_3$ content: 2 wt %) was used instead of the blanket composed of the bio-soluble fibers a. The results are shown in Table 1.

Comparative Example 1

A blanket was prepared and evaluated in the same manner as in Example 1, except that impregnation with the acidic cationic colloidal silica was not conducted. The results are shown in Table 1. The flexural strength of the blanket could not be measured.

Comparative Example 2

A blanket was prepared and evaluated in the same manner as in Example 8, except that impregnation with the acidic cationic colloidal silica was not conducted. The results are shown in Table 1. The flexural strength of the blanket could not be measured.

Examples 9 to 15

Alkaline Anionic Colloidal Silica

Wet blankets were prepared and evaluated in the same manner as in Example 1, except that 10 to 170 parts by weight of ST-30 (manufactured by Nissan Chemical Industries, Ltd., solid content: 30 wt %, average particle size: 20 nm, pH: 10.0, solvent: water) as the alkaline anionic colloidal silica was used instead of 50 parts by weight of the acidic cationic colloidal silica. The results are shown in Table 2.

Example 16

Alkaline Anionic Colloidal Silica

A wet blanket was prepared and evaluated in the same manner as in Example 12, except that a blanket composed of the bio-soluble inorganic fibers b was used instead of the blanket composed of the bio-soluble inorganic fibers a. The results are shown in Table 2.

Example 17

Acidic Anionic Colloidal Silica

A wet blanket was, prepared and evaluated in the same manner as in Example 3, except that ST-O40 (manufactured by Nissan Chemical Industries, Ltd., solid content: 40 wt %, average particle size: 30 nm, pH: 2.4, solvent: water) as the acidic anionic colloidal silica was used instead of the acidic cationic colloidal silica. The results are shown in Table 2.

Example 18

Acidic Anionic Colloidal Silica

A wet blanket was prepared and evaluated in the same manner as in Example 17, except that the blanket composed of bio-soluble fibers b was used instead of the bio-soluble inorganic fibers a. The results are shown in Table 2.

TABLE 1

| | | Example 1 | Example 2 | Example 3 | Example 4 | Example 5 | Example 6 | Example 7 | Example 8 | Com. Ex. 1 | Com. Ex. 2 |
|---|---|---|---|---|---|---|---|---|---|---|---|
| Kind of fiber | | | | | Fiber a | | | | Fiber b | Fiber a | Fiber b |
| Kind of colloidal silica | | | | | Cationic, acidic | | | | | — | — |
| Solid content (parts by weight) | | 50 | 80 | 110 | 140 | 150 | 160 | 180 | 110 | 0 | 0 |
| Solvent content (wt %) | | 57 | 64 | 68 | 70 | 71 | 71 | 72 | 68 | 0 | 0 |
| Density (g/cm³) | | 0.24 | 0.29 | 0.33 | 0.37 | 0.40 | 0.42 | 0.46 | 0.34 | 0.18 | 0.18 |
| pH | Immediately after production | 4.9 | 4.8 | 4.9 | 5 | 4.8 | 5.1 | 4.8 | 4.4 | — | — |
| | One month after production | 4.8 | 4.6 | 4.5 | 4.6 | 4.8 | 4.5 | 4.8 | 4.4 | — | — |
| Shrinkage by heating (%) | Immediately after production | 1.6 | 1.5 | 1.6 | 1.6 | 1.5 | 1.7 | 1.8 | 2.2 | 0.7 | 2.5 |
| | One month after production | 1.6 | 1.6 | 1.5 | 1.7 | 1.5 | 1.6 | 1.7 | 2.2 | 0.7 | 2.5 |
| Flexural strength (MPa) | Immediately after production | 0.2 | 0.3 | 0.5 | 0.6 | 0.8 | 1.2 | 1.3 | 0.4 | Could not be measured | Could not be measured |
| | One month after production | 0.2 | 0.4 | 0.4 | 0.4 | 1.0 | 1.1 | 1.4 | 0.5 | Could not be measured | Could not be measured |
| Resistance to wind erosion | One month after production | ○ | ○ | ○ | ○ | ○ | ○ | ○ | ○ | X | X |

TABLE 1-continued

|  |  | Example 1 | Example 2 | Example 3 | Example 4 | Example 5 | Example 6 | Example 7 | Example 8 | Com. Ex. 1 | Com. Ex. 2 |
|---|---|---|---|---|---|---|---|---|---|---|---|
| Winding properties | Immediately after production | ○ | ○ | ○ | ○ | ○ | ○ | ○ | ○ | ○ | ○ |
|  | Two months after production | ○ | ○ | ○ | ○ | ○ | ○ | ○ | ○ | ○ | ○ |

|  |  | Example 9 | Example 10 | Example 11 | Example 12 | Example 13 | Example 14 | Example 15 | Example 16 | Example 17 | Example 18 |
|---|---|---|---|---|---|---|---|---|---|---|---|
| Kind of fiber |  |  |  |  | Fiber a |  |  |  | Fiber b | Fiber a | Fiber b |
| Kind of colloidal silica |  |  |  |  | Anionic, alkaline |  |  |  |  | Anionic, acidic |  |
| Solid content (parts by weight) |  | 10 | 30 | 80 | 110 | 130 | 160 | 170 | 110 | 110 | 110 |
| Solvent content (wt %) |  | 18 | 35 | 51 | 55 | 57 | 59 | 60 | 55 | 44 | 44 |
| Density (g/cm$^3$) |  | 0.21 | 0.21 | 0.28 | 0.33 | 0.37 | 0.42 | 0.44 | 0.32 | 0.35 | 0.32 |
| pH | Immediately after production | 10.7 | 10.7 | 10.8 | 10.8 | 10.8 | 10.8 | 11 | 9.8 | 5.6 | 4.3 |
|  | One month after production | 11 | 11 | 11.0 | 11.2 | 11.2 | 11.0 | 11.2 | 10 | 10.4 | 5.3 |
| Shrinkage after heating (%) | Immediately after production | 1.8 | 2.0 | 2.5 | 2.0 | 2.4 | 2.3 | 2.3 | 2.8 | 0.9 | 2.6 |
|  | One month after production | 1.9 | 2.2 | 2.4 | 2.2 | 2.4 | 2.3 | 2.3 | 3.6 | 4.1 | 3.6 |
| Flexural strength (MPa) | Immediately after production | 0.13 | 0.2 | 0.3 | 0.5 | 0.8 | 1.2 | 1.3 | 0.4 | 0.5 | 0.5 |
|  | One month after production | 0.13 | 0.2 | 0.4 | 0.4 | 0.8 | 1.2 | 1.3 | 0.4 | 0.5 | 0.8 |
| Resistance to wind erosion | One month after production | ○ | ○ | ○ | ○ | ○ | ○ | ○ | ○ | ○ | ○ |
| Winding properties | Immediately after production | ○ | ○ | ○ | ○ | ○ | ○ | ○ | ○ | ○ | ○ |
|  | Two months after production | ○ | ○ | ○ | ○ | ○ | ○ | X | X | X | X |

From Tables 1 and 2, it can be understood that the wet blankets of the Examples are improved in strength as compared with the wet blankets of the Comparative Examples. Further, it can be understood that the wet blankets containing the acidic cationic colloidal silica exhibited improved heat resistance and winding properties for the blanket composed of Mg silicate fibers and Ca silicate fibers, and the wet blankets containing the alkaline anionic colloidal silica exhibited improved heat resistance for the blanket composed of Ca silicate fibers.

INDUSTRIAL APPLICABILITY

A refractory material such as a lining material can be produced by applying the wet blanket of the invention to a furnace or the like, followed by curing by drying, heating or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A method of applying a wet blanket of bio-soluble inorganic fibers to a surface, said method comprising:
    providing a wet blanket comprising bio-soluble inorganic fibers having a physiological saline dissolution ratio of 1% or more, said wet blanket being impregnated with a colloidal silica liquid, and a solvent content of about 15 wt % to about 75 wt %;
    storing said wet blanket in a sealed bag;
    then removing said wet blanket from the bag and applying it while still wet, to a surface; and
    then curing the blanket by heating and. drying same, in situ, on said surface;
    wherein the biosoluble inorganic fibers comprise about 50 wt % to about 82 wt % of total $SiO_2$, $ZrO_2$, $Al_2O_3$ and $TiO_2$, and about 18 wt % to about 50 wt % of total alkali metal oxides and alkaline earth metal oxides.

2. The method according to claim 1, wherein the colloidal silica is acidic cationic colloidal silica.

3. The method according to claim 1, wherein the colloidal silica is acidic anionic colloidal silica.

4. The method according to claim 2, wherein the colloidal silica liquid has a pH of about 2 to about 6.

5. The method according to claim 3, wherein the colloidal silica liquid has a pH of about 2 to about 6.

6. The method according to claim 1, wherein the colloidal silica is alkaline anionic colloidal silica.

7. The method according to claim 6, wherein the colloidal silica liquid has a pH of about 8 to about 11.

8. The method according to claim 1, wherein the wet blanket comprises colloidal silica in an amount of about 10 parts by weight to about 200 parts by weight in terms of solid matter relative to 100 parts by weight of the bio-soluble inorganic fibers.

9. The method according to claim 1, wherein the bag is a plastic bag.

10. The method according to claim 1, wherein the wet blanket is stored for a duration of at least one month.

11. A method of applying a wet blanket of bio-soluble inorganic fibers to a surface, said method comprising:
   providing a wet blanket comprising bio-soluble inorganic fibers having a physiological saline dissolution ratio of 1% or more, said we blanket being impregnated with a colloidal silica liquid, and a solvent content of about 15 wt % to about 75 wt %;
   storing said wet blanket in a sealed bag;
   then removing said wet blanket from the bag and applying it while still wet to a surface; and
   then curing the blanket by heating and drying same, in situ, on said surface;
   wherein the bio-soluble inorganic fibers comprise about 66 wt % to about 82 wt % of $SiO_2$, about 10 wt % to about 33 wt % of CaO, about 1 wt % or less of MgO, and less than about 3 wt % of $Al_2O_3$.

12. The method according to claim 11, wherein the colloidal silica is acidic cationic colloidal silica.

13. The method according to claim 11, wherein the colloidal silica is acidic anionic colloidal silica.

14. The method according to claim 11, wherein the colloidal silica is alkaline anionic colloidal silica.

15. The method according to claim 11, wherein the wet blanket comprises colloidal silica in an amount of about 10 parts by weight to about 200 parts by weight in terms of solid matter relative to 100 parts by weight of the bio-soluble inorganic fibers.

16. A method of applying a wet blanket of bio-soluble inorganic fibers to a surface, said method comprising:
   providing a wet blanket comprising bio-soluble inorganic fibers having as physiological saline dissolution ratio of 1% or more, said wet blanket being impregnated with a colloidal silica liquid, and a solvent content of about 15 wt % to about 75 wt %;
   storing said wet blanket in a sealed bag;
   then removing said wet blanket from the bag and applying it while still wet to a surface; and
   then curing the blanket by heating and drying same, in situ, on said surface:
   wherein the bio-soluble inorganic fibers comprise about 66 wt % to about 82 wt % of $SiO_2$, about 1 wt % to about 9 wt % of CaO, about 10 wt % to about 30 wt % of MgO, and less than 3 wt % of $Al_2O_3$.

17. The method according to claim 16, wherein the colloidal silica is acidic cationic colloidal silica.

18. The method according to claim 16, wherein the colloidal silica is acidic anionic colloidal silica.

19. The method according to claim 16, wherein the colloidal silica is alkaline anionic colloidal silica.

20. The method according to claim 16, wherein the wet blanket comprises colloidal silica in an amount of about 10 parts by weight to about 200 parts by weight in terms of solid matter relative to 100 parts by weight of the bio-soluble inorganic fibers.

* * * * *